April 9, 1946.　　C. J. LEMONT ET AL　　2,398,016
PIPE MOLDING MACHINE
Filed May 15, 1942　　8 Sheets-Sheet 2

INVENTOR.
Clarence J. Lemont
Anthony J. Hoynacke
BY Chester W. Brown
ATTORNEY.

April 9, 1946.    C. J. LEMONT ET AL    2,398,016
PIPE MOLDING MACHINE
Filed May 15, 1942    8 Sheets-Sheet 5

April 9, 1946.   C. J. LEMONT ET AL   2,398,016
PIPE MOLDING MACHINE
Filed May 15, 1942   8 Sheets-Sheet 8

INVENTOR.
Clarence J. Lemont
BY Anthony J. Hornacke
Chester W. Brown
ATTORNEY.

Patented Apr. 9, 1946

2,398,016

UNITED STATES PATENT OFFICE 2,398,016

PIPE MOLDING MACHINE

Clarence J. Lemont, South Milwaukee, and Anthony J. Hoynacke, Milwaukee, Wis., assignors to Line Material Company, Milwaukee, Wis., a corporation of Delaware Application May 15, 1942, Serial No. 443,158

25 Claims. (Cl. 25—30)

This invention relates to fibre underground conduit and to the manufacture thereof, and it has to do with machinery and equipment for producing the new product. More specifically, the invention deals with the production of novel non-laminar seamless asbestos conduit composed of asbestos fibre and Portland cement; but the newly developed processes and equipment hereinafter described are not restricted in their utility to the above-specified composition.

The principal objects of the invention are to provide underground conduit having the strength to withstand the loads and shocks to which it is apt to be subjected in service; which is not adversely affected by continuous subjection to moisture and subterranean environment; which is sufficiently tough to resist rough handling; and which can be manufactured economically. Other important objects are: easy and dependable control of wall thickness and maintenance of a degree of surface smoothness which is satisfactory to the trade.

Insofar as we are aware, it has been universal practice heretofore to manufacture fibre underground conduit by a process which includes winding a thin web of wet fibrous pulp on a mandrel, in as many layers as necessary to realization of the specified wall thickness; but conduit so produced is susceptible to deterioration by moisture and is often found to have become disrupted between laminations after long subjection to humid subterranean environment. This, evidently, is attributable to the absence of adequate interlaminar bonding and to consequent seepage of moisture along the inter-laminar interstices; and that conclusion is supported by the fact that the disruptions occur almost entirely at and adjacent the conduit ends—indicating entry of moisture at end points where the interstices are exposed.

The present invention has its genesis in the concept—since proved to have been well founded—that a non-laminar seamless conduit should be less susceptible to disintegration by moisture than was found to be true of laminated conduit. The new product is completely homogeneous, non-laminar and seamless and preferably is of the same composition as the prior laminated product, namely, Portland cement and asbestos fibre. But, as previously stated, the invention, so far as equipment and process are concerned, is not limited to any particular kind of fibre nor to any specific binder.

It may be said that the invention entails two new processes or a single process comprising two distinct steps; and while both steps are employed consecutively to accomplish the desired end result, it will become apparent that either step might be employed usefully without the other.

The first new process or step, in the order of its occurrence, has to do with formation, in the plastic state, of a non-laminar, seamless tube (the potential conduit) of substantially uniform and controlled thickness on a mandrel which determines its internal diameter and serves as a supporting core for said tube during a subsequent rolling and pressing operation thereon. This process or step consists in submerging a perforated mandrel in a thin wet fluid mixture or slurry of fibre and binder, such as diffused asbestos fibre and Portland cement, and in applying a vacuum or partial vacuum to the interior of the mandrel while rotating the same—thereby causing a fibrous coating or mantle of uniform thickness to adhere to the mandrel—which mantle, when compressed and hardened constitutes the end product. It is found that the thickness of the adherent mantle, and consequently, the wall thickness of the resultant conduit is a function of the length of time the mandrel is rotated in the wet mixture as well as a function of the degree of evacuation of the mandrel, and to some extent a function of the viscosity of the mixture and the speed of rotation of the mandrel.

Following a predetermined lapse of time, predicated upon the desired wall thickness, the coated mandrel is withdrawn from the bath and a second process or step follows, either immediately or after an intervening short period during which the tubular mantle may be allowed to acquire an initial set.

The second process or step consists in placing the coated mandrel within a noose-like formation in a long belt of canvas or other suitable flexible, preferably pervious, material and effecting a rapid rolling operation thereon while keeping the belt tightly looped about the coated mandrel. By so doing the still plastic conduit wall is rolled to uniform thickness and at the same time is subjected to high radially directed pressure which serves to compact it and thereby convert what would otherwise be a more or less spongy product into one which is dense and homogeneous.

Referring to the drawings which accompany this specification.

Figures 1, 2, 3, 4:
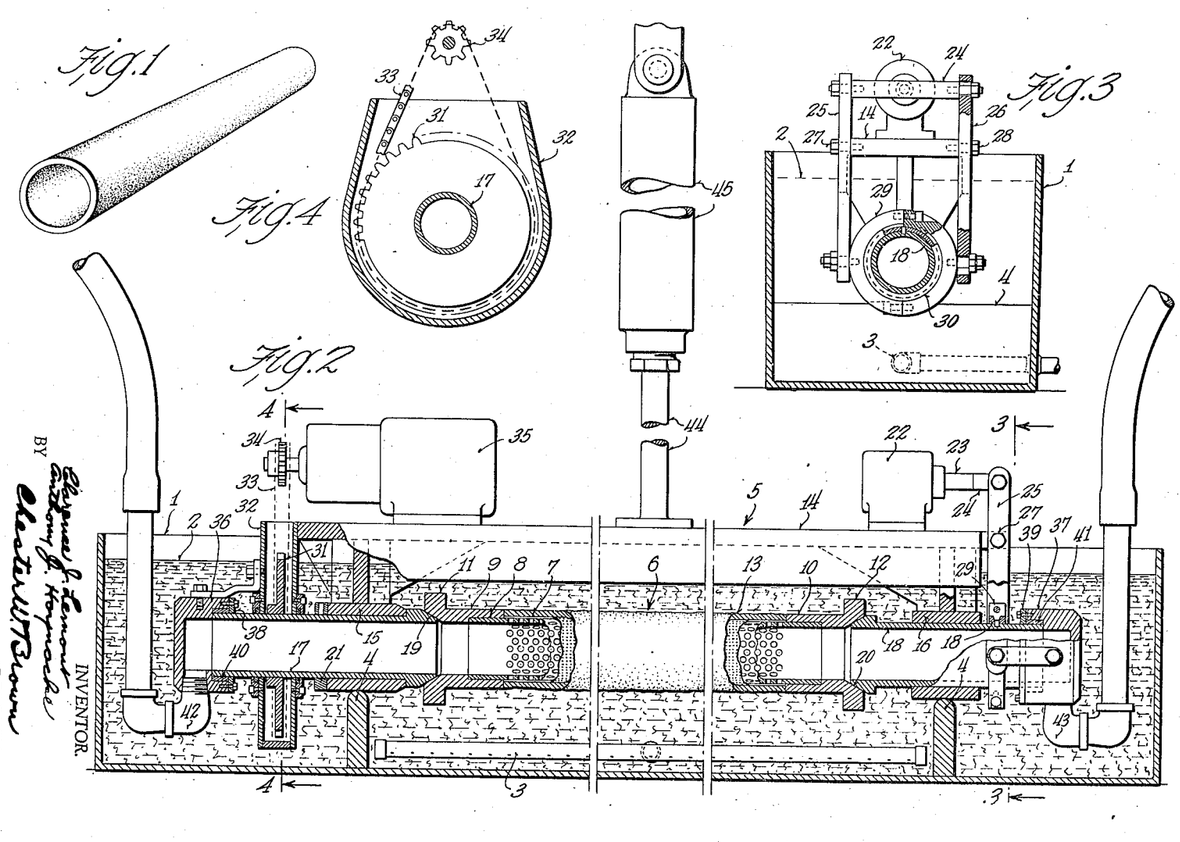
Fig. 1 is a perspective view of a length of finished conduit.
Fig. 2 is a longitudinal sectional view of the equipment employed for depositing a plastic tubular coating of asbestos fibre and cement binder on a mandrel.
Fig. 3 is a cross-sectional view taken along the line 3—3 of Fig. 2.
Fig. 4 is a cross-sectional view taken along the line 4—4 of Fig. 2.

A specimen of the finished new product, comprising a length of tubular, seamless, non-laminar fibre conduit is shown perspectively in Fig. 1. The presently established standard size of such conduit has an inside diameter of 4", an outside diameter of 4¾", and a length of 8 feet; but it is to be understood that the invention is not limited to standard size conduit, nor to processes or equipment for manufacturing conduit of any particular size or range of sizes.

The process of applying a homogeneous, non-laminar, plastic mantle or coating of fibrous asbestos and Portland cement binder to the exterior of a mandrel is performed with the equipment depicted in Figs. 2, 3 and 4. This equipment comprises an elongated, rectangular trough-like receptacle 1 which is kept nearly filled with a rather thin slurry of Portland cement and asbestos fibre including a suitable quantity of water. The slurry is identified by numeral 2. It preferably is kept in a state of agitation by jets of compressed air from a perforated pipe 3 extending along the bottom of the trough lengthwise thereof. The jets of air should be projected downwardly and horizontally rather than upwardly and they serve to prevent the asbestos fibre precipitating to the bottom of the receptacle.

Fixed within and disposed at the bottom of receptacle 2, are a pair of upwardly extending ribs 4, which serve as supports for a portable conveyor identified as a whole by reference numeral 5. The conveyor functions as means for supporting and handling mandrel 6, and for transporting said mandrel to and from the receptacle, and for holding said mandrel submerged in the pool of fibrous slurry while the coating or mantle is being deposited thereon. It also provides means for slowly rotating the submerged mandrel, and facilitates application of a partial vacuum to the interior of the mandrel during such submersion and thereafter, if required, while the coated mandrel is being conveyed to the hereinafter described rolling and pressing machine.

Mandrel 6 comprises a fine mesh tubular screen 7 made of perforated relatively thin sheet metal, preferably brass or bronze, wherein the perforations are of a diameter of the order of $\frac{1}{32}$" and closely spaced. The length of the screen corresponds to the length of conduit it is desired to form thereon, and that length, as previously stated, has been standardized at 8 feet. The outside diameter of the screen corresponds to the inside diameter of the conduit, which usually is four inches. To avoid or minimize clogging of its small perforations the tubular screen should be as thin as practical considerations will permit. A thickness of $\frac{1}{32}$" has proved quite satisfactory. But a perforated tube made of stock of such extreme thinness is rather frail and therefore not well adapted to withstand rough handling or to resist the forces to which it is to be subjected unless it be appropriately reinforced. To effect such reinforcement there is withdrawably telescoped within screen 7 a perforated tube 8 having substantial wall thickness and perforations of fairly large diameter closely spaced so that the aforementioned fine screen perforations will not be obstructed any more than is unavoidable. Tube 8 is readily withdrawable from screen 7, but should be a good running fit therein. Tube 8 is long enough to extend beyond screen 7 at both ends for a distance sufficient to provide a firm grip thereon for a pair of terminal members 9 and 10 which are bored to fit the respective ends of tube 8, but are not secured to said tube except frictionally. Terminal members 9 and 10 are flanged exteriorly to form rollers 11 and 12, the purpose of which will later be explained.

The objective is to deposit, by filtration, on the exterior peripheral surfaces of screen 7 a plastic coating or mantle 13 of asbestos fibre and Portland cement binder which, after subsequent working and hardening, will become a length of finished conduit. The deposition is accomplished by creating a partial vacuum within the mandrel while the latter is completely submerged in the slurry; and the mandrel is continuously rotated slowly about its longitudinal axis while the fibrous mantle is being deposited thereon. By greatly reducing the atmospheric pressure within the submerged mandrel, fluid, principally water, is caused to percolate through the tubular screen to the interior of the mandrel while a residuum of asbestos fibre and cement, from which a large part of the water content has resultantly been extracted, adheres to the screen. The coating or mantle 13 quickly accumulates and its thickness is dependably proportionate to the length of time the mandrel remains in the pool of slurry, and to the degree of vacuum created within the mandrel. The viscosity of the slurry also is apt to have some influence on the time required to build up a specified wall thickness.

The coating would form even if the mandrel were not rotated but it could not be depended upon to be of substantially uniform thickness since there is a tendency for the solids to deposit on the top of the screen in preference to the bottom. That tendency could be off-set, at least partially, by circulating the slurry around the mandrel, without rotating the mandrel, and that alternative is within the scope of the invention; but it is not a preferred procedure. The speed of rotation of the mandrel may be ten revolutions per minute; but the speed is not critical save that it should be rather slow, yet fast enough to avoid unevenness of deposit.

Portable conveyor 5 comprises a supporting member 14 in the form of a horizontally disposed steel plate from which are suspended a pair of spaced aligned bearings 15 and 16. Journaled in bearing 15 is a rotatable hollow spindle 17; and similarly journaled in bearing 16 is a second hollow spindle 18. These spindles are spaced apart lengthwise to receive between them mandrel 6, and the complementary mandrel-engaging ends of the two spindles are externally tapered at 19 and 20, respectively, to engage the corresponding internally tapered bores of terminal members 9 and 10. The engagement between the spindles and the ends of the mandrel is such as to center the mandrel and to provide substantially vacuum-type joints between the spindles and mandrel. Spindle 18 is slidable axially in bearing 16 toward and away from the mandrel to effect engagement and release of the mandrel. Spindle 17 is restrained against axial movement by a collar 21. An air or hydraulic cylinder 22 is mounted on supporting member 14 and its piston rod 23 is connected through a cross-bar 24 to the upper ends of a pair of parallel levers 25, 26 which are pivotally supported on member 14 at 27, 28 and pivotally connected at their lower ends to diametrically opposite sides of a split collar 29 which is circumferentially splined to a ring 30 secured to the exterior of spindle 18 and rotatable therewith. The split collar is non-rotatable and serves as a medium, in conjunction with levers 25 and 26, whereby cylinder 22 is operative to shift spindle 18 lengthwise to engage and disengage the mandrel.

Keyed or otherwise drivingly secured to spindle 17 is a driven sprocket 31 enclosed within a housing 32 and connected through a roller chain 33 to a driving sprocket 34 on the shaft of a speed-reducing gear forming part of an electric motor 35 mounted on supporting member 14 and forming an integral part of the conveyor unit.

To the outer ends of spindles 17 and 18 are connected slip-joints 36, 37 respectively; and these are secured to the spindle through the medium of rings 38, 39 and collars 40, 41. The collars are removably secured to the spindles and the rings are detachably secured to the slip-joints. The slip-joints are non-rotatable while the spindles are rotatable relatively thereto; and slip-joint 37 is movable axially with spindle 18. The slip-joints serve to provide vacuum-tight connections with the interiors of the spindles and, thus, with the interior of the mandrel. The slip-joints are each provided with suitable pipe fittings 42, 43 which preferably are connected to the bottom thereof and are adapted, in turn, for connection to a vacuum pump (not shown) or other suitable means for creating a partial vacuum within the mandrel. There would, of course, be no objection to a complete vacuum being created but that manifestly is not attainable. By keeping all joints reasonably tight and using a pump of adequate capacity, a high degree of vacuum can be created within the mandrel. While the structure illustrated provides for connecting the vacuum pump or pumps to both ends of the mandrel, it is not strictly necessary to make connection at both ends. However, by so doing more certain drainage of the interior of the mandrel can be effected.

The portable conveyor is suspended on a piston rod 44 of an air-cylinder 45 which in turn is supported by an overhead trolley, not shown. Cylinder 45 and its piston rod 44 serve to lift and lower the portable conveyor together with the mandrel while the overhead trolley provides for horizontal transportation of the conveyor and makes it possible to transfer the mandrel from the slurry receptacle directly to the rolling and pressing machine where the next operation is performed on the plastic conduit. The overhead trolley also permits the portable conveyor to be moved to a suitable position for reloading.

By so constructing the portable conveyor that it forms a self-contained removable unit with the mandrel, there is avoided the alternative of providing stuffing boxes and bearings in the ends of receptacle 1; and there is also avoided the undesirable necessity of effecting vacuum-tight connections with the mandrel after the mandrel has been placed in the receptacle, and the accompanying necessity of draining or partially draining the slurry from the receptacle prior to placing the mandrel therein.

The time required to deposit on the mandrel a plastic coating of fibre and cement of the depth required to produce finished conduit of standard ⅜" wall thickness is of the order of two minutes, with a vacuum corresponding approximately to 20" of mercury column.

Suitable manually-operated means are employed for controlling the operation of the portable conveyor, but it is considered unnecessary to illustrate these.

When the mandrel has been submerged and rotated, under vacuum, for the requisite period of time, it is lifted out of the pool of slurry by means of the portable conveyor and transferred thereby to a machine for rolling and pressing the fibrous tubular mantle; in which machine the mantle is compressed to squeeze out the bulk of occluded water and is thereby rendered dense and homogeneous; and wherein the mantle is rolled while being squeezed to ensure a uniform wall thickness and to obtain a satisfactorily smooth exterior surface. The machine referred to is appropriately designated herein as a rolling and pressing machine and it is illustrated in Figs. 5 to 17 inclusive of the drawings.

Figure 5:
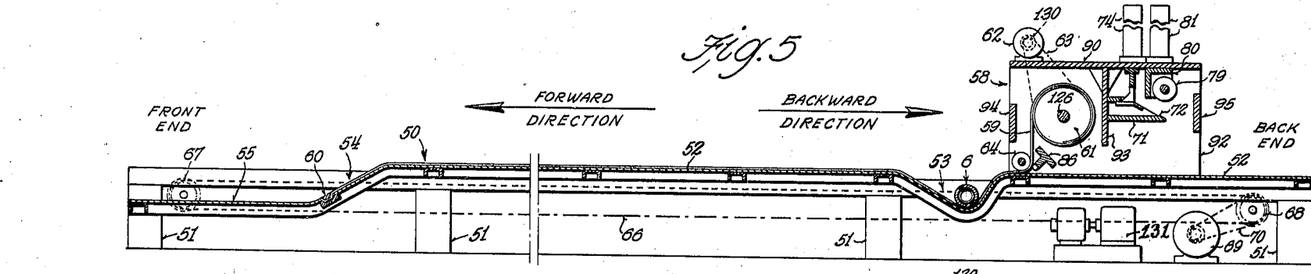
Fig. 5 is a longitudinal sectional view of a rolling and pressing machine, showing the carriage in its starting position.

Fig. 5 is a small scale longitudinal sectional view of the rolling and pressing machine and will serve, in conjunction with Figs. 6 to 10, for the purposes of general description and explanation of the mode of operation. The remaining Figures, 11 to 17 inclusive, are enlarged details of the rolling and pressing machine, which details could not adequately be illustrated in the small scale drawings of Figs. 5 to 10.

Referring more particularly to Fig. 5, but also to Figs. 6 to 10 inclusive, the rolling and pressing machine comprises an elongated track structure 50 which is approximately 40 feet long, more or less, and about 10 feet wide over all—assuming that standard 8 foot conduit is to be rolled. The track structure is fabricated of suitable structural steel shapes and plates, which it is unnecessary for the moment to describe in minute detail, and it is supported on suitable stanchions or piers 51 which may conveniently be of concrete or wood.

The upper surface or floor of the track consists of a steel plate 52 the width of which is such as to fit rather closely between roller flanges 11 and 12 of mandrel 6 (see Fig. 14) and it extends horizontally except at point 53 where it dips to form a pocket, and at point 54 where it slopes downwardly to join a short horizontal portion 55 of lower elevation at the front end of the track. Disposed at either side of track 52 (see Fig. 14) are rails 56 and 57. These may be square bars, as shown, extending nearly the whole length of the track structure and following the contour of the dip at 53 and the incline at 54. Rollers 11 and 12 of the mandrel rest on these rails and are designed to be rollable therealong lengthwise of the track.

A carriage 58 overlies the track and is slidable lengthwise thereof, back and forth, substantially from end to end of the track. The carriage is shown in Fig. 5 at the back end of its travel, and in Fig. 10 it is shown at the front end of its travel. The two extremities of the track structure have been arbitrarily defined as the "front end" and "back end." Movement of the carriage along the track toward the front end thereof is arbitrarily defined as "forward movement or travel," and movement of the carriage toward the back end of the track is arbitrarily defined as "backward movement or travel." Those designations have no particular significance, descriptively, but they serve as convenient means of distinguishing one end of the track from the other and of intelligibly specifying the direction of movement of the carriage.

A long woven-canvas belt 59 having a width approximately coextensive with the length of mantle 13 has one end anchored at 60 near the front end of the track and its other end connected to a winding reel or drum 61 which is mounted on and movable forward and back along the track with carriage 58.

An hydraulic motor 62 mounted on carriage 58 is connected to reel 61 by means of a drive chain 63 and serves to rotate the reel for winding belt 59 thereon. As shown in Fig. 5, belt 59 extends from its anchorage at 60 along the top of the track, follows the dip at 53, and passes behind a guide roll 64 which is mounted on and movable with the carriage.

With the carriage in its back position, as depicted in Fig. 5, the rolling and pressing machine is in readiness to receive a mandrel 6 with tubular fibrous coating or mantle 13 thereon, and such a mandrel is shown positioned in the bottom of the dip or pocket at 53. The depth of the pocket is such as will permit the carriage to pass over the mandrel in its forward travel, which, in Fig. 5 is about to commence. Pocket 53 constitutes the starting point for the mandrel with respect to the rolling and pressing operation which is about to be described.

Extending practically from end to end of the track and disposed at either side thereof are a pair of drive chains 65 and 66. These embrace sprockets 67, 68 at the two ends of the track structure and are driven by an hydraulic motor 69 through a chain 70. Motor 69 is reversible and, therefore, is operative to drive chain 65 and 66 in either direction.

Carriage 58 is connected with the upper spans of chains 65 and 66 and is movable by said chains along the track in both directions alternately; and, as presently will be pointed out, the carriage is also movable forwardly, but not backwardly, by belt 59 in response to rotation of winding reel 61.

Figure 6:
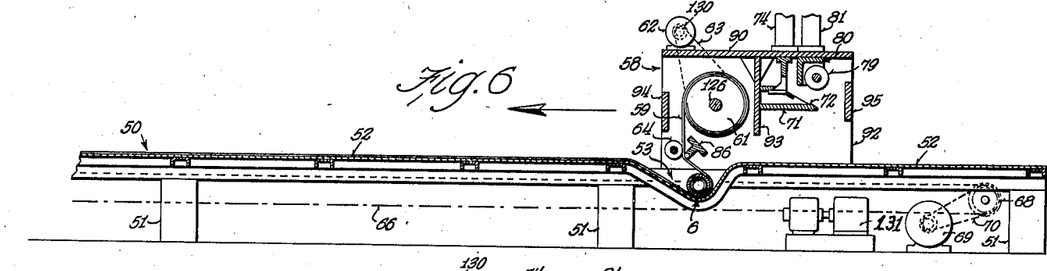
Fig. 6 is a fragmentary view of the rolling and pressing machine showing the carriage in a slightly advanced position.
Figure 7:
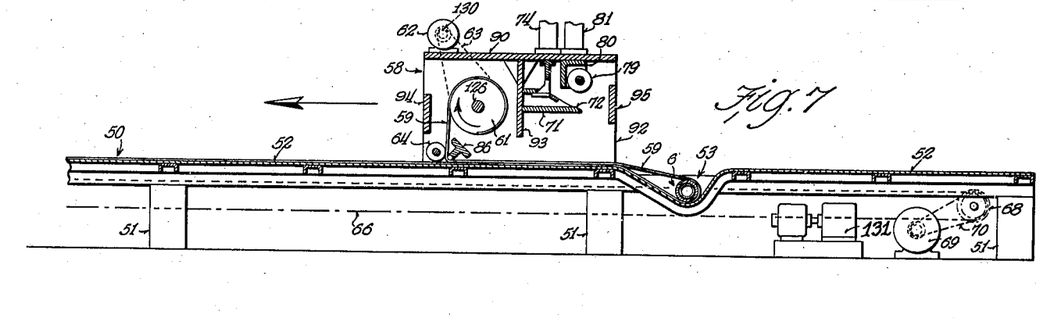
Fig. 7 is similar to Fig. 6, but showing the carriage advanced a little further toward the front end of the machine.

With the coated mandrel in place, as shown in Fig. 5, the carriage is driven forwardly by motor 69, and, as depicted successively in Figs. 6 and 7, belt 59 is looped around the mandrel into embracing engagement with the peripheral surface of the mantle, as a result of the forward movement of the carriage.

The carriage having reached the position in which it is shown in Fig. 7, another action is about to occur with respect to which it is necessary first to describe some additional operating parts not previously mentioned. These parts include what may appropriately be called a constrictor member, but which sometimes is also referred to as a shoe or a tension bar, or barrier. The part in question is identified by reference numeral 71. It is a rather heavy casting extending crosswise of the track and it has a blade-like portion 72, preferably including an edge roller 73 (see Fig. 13) which extends parallel to the mandrel and is coextensive laterally of the track with the width of belt 59. Constrictor member 71 has limited freedom of movement, forward and back, relatively to the carriage, and it is operative to be elevated and lowered by means of a hydraulic lift comprising a pair of cylinders 74 (both cylinders shown in Fig. 17) and piston rods 75, the lower ends of which are connected to a member 76 having three depending cams having angular cam surfaces 77 (see Figs. 13 and 17) designed to engage an overlying edge 78 of the constrictor member when member 76 is moved upwardly by piston rods 75 and cylinders 74. The function of the cams is to move the constrictor member slightly forward as a preliminary to its upward movement; and the reason for so doing will be explained later. The dual hydraulic lift comprising cylinders 74 and piston rods 75 is mounted on the carriage and is movable therewith along the track.

Figure 14:
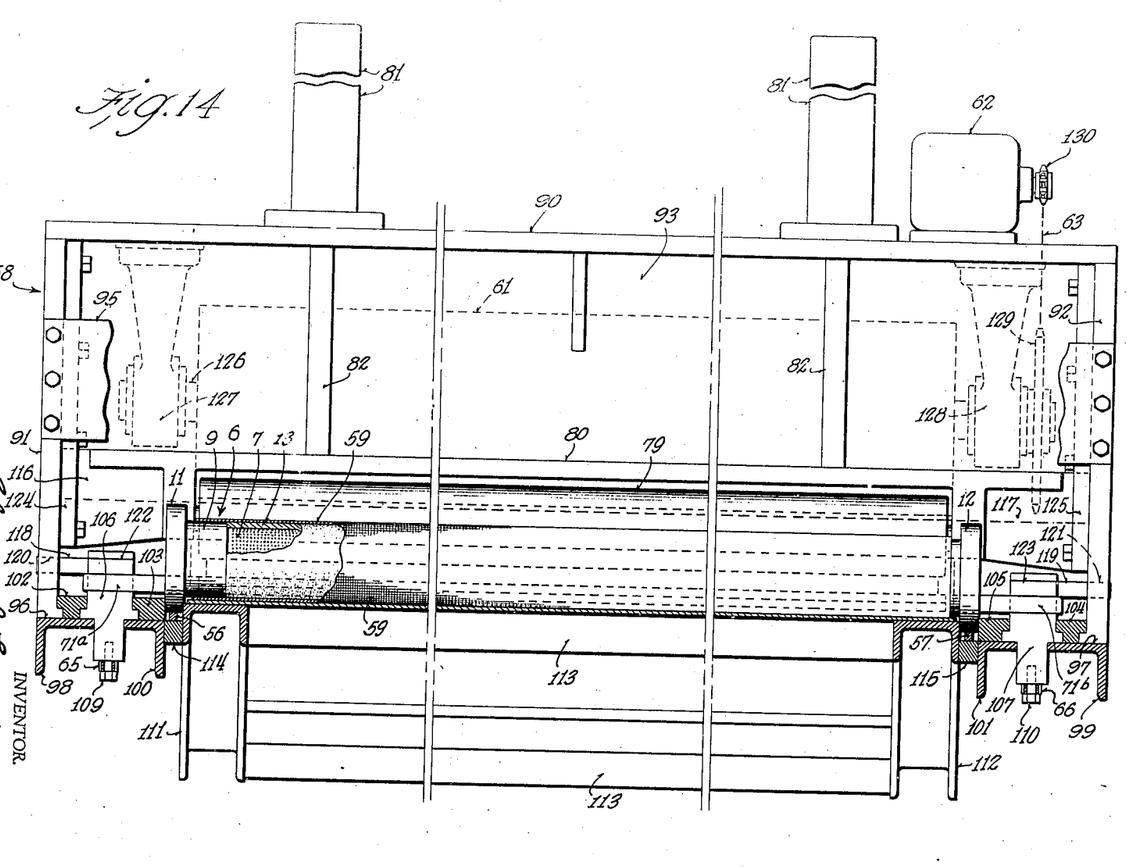
Fig. 14 is a cross sectional view through the track structure taken along the line 14—14 of Fig. 13, and showing the carriage in end elevation.

In addition to the constrictor member and its appurtenances, there is mounted on the carriage an ironing roll 79 which is journaled at both ends in a cross-head casting 80 and is movable up and down with said cross-head member by means of a second dual hydraulic lift including a pair of cylinders 81 with piston rods 82. These two cylinders with their piston rods are shown in Fig. 14. Ironing roll 79 is approximately co-extensive lengthwise with the width of belt 59, and a little longer than mantle 13 (see Fig. 14).

Figure 8:
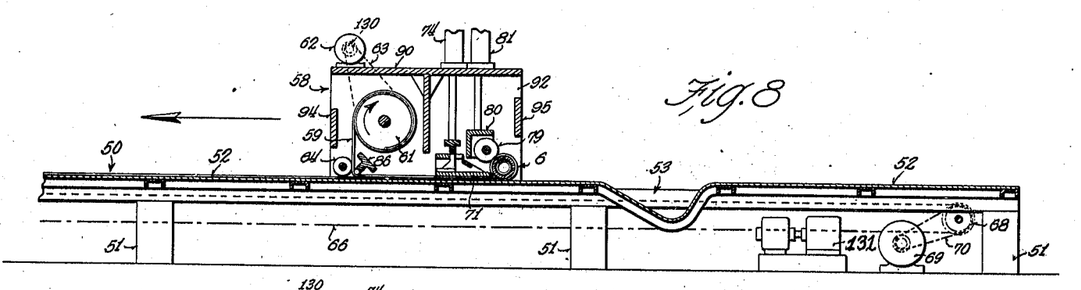
Fig. 8 is similar to Fig. 7, but shows the constrictor member and ironing roll in their lowered positions.

In Figs. 5, 6, 7, 11, and 12 constrictor member 71 and ironing roll 79 are shown in their elevated positions; but passing from Fig. 7 to Fig. 8, it will be seen that both the constrictor member and ironing roll have been lowered. Here, it will be observed, the constrictor member has been brought down into engagement with the top side of belt 59, and the ironing roll has been brought into tangential engagement with the external periphery of the loop in the belt which embraces the mandrel. This is clearly illustrated on a larger scale in Fig. 13, and from examination of the latter figure it will be seen that the roller edge 73 of blade-like portion 72 bears against the belt in a manner adapted to constrict the neck of the loop at 83 to such an extent that it is caused to embrace mantle 13 throughout nearly its whole circumference. The belt loop encircling the mandrel is, in effect, a noose and one of its functions, simulating that of a noose, is to squeeze tightly the plastic mantle. But, in addition to squeezing the mantle, it is the intention at the same time, to roll the mandrel along the surface of the belt while simultaneously kneading and compressing the mantle by means of ironing roll 79. And the conjoint effect of all three actions is to compress and iron the mantle so as to render it dense and of uniform wall thickness, as well as truly circular and externally smooth.

The forward travel of the carriage to approximately the point at which it is shown in Fig. 7 is effected by means of chains 65, 66 and hydraulic motor 69. At that point the constrictor member and ironing roll are lowered, as previously described, and thereafter the forward movement of the carriage is accomplished by winding the belt 59 on reel 61. This results in placing tension on the leading portion of the belt at 84 and causing the loop or noose which encircles the mandrel and mantle to be pulled taut. Thus, there is effected a forward rolling movement of the mandrel which incidentally shortens the trailing portion 85 of belt 59 and produces a forward thrust by the mandrel against the constrictor member and the ironing roll. The thrust transmitted to the ironing roll by the mandrel and engendered by the tension applied to the belt is the force which causes the carriage to move forward during the rolling and pressing operation.

As will later be seen, the thrust transmitted to the constrictor member from the mandrel is effective to move the constrictor member forward but is not effective to move the carriage. Since belt 59 moves longitudinally around the periphery of the mantle, it follows that the mantle rolls along the contacting surface of the belt, within the noose, at points adjacent the neck of the noose where it makes and breaks contact with the belt. At other points within the noose there is no relative motion between the belt and the mantle.

Figure 13:
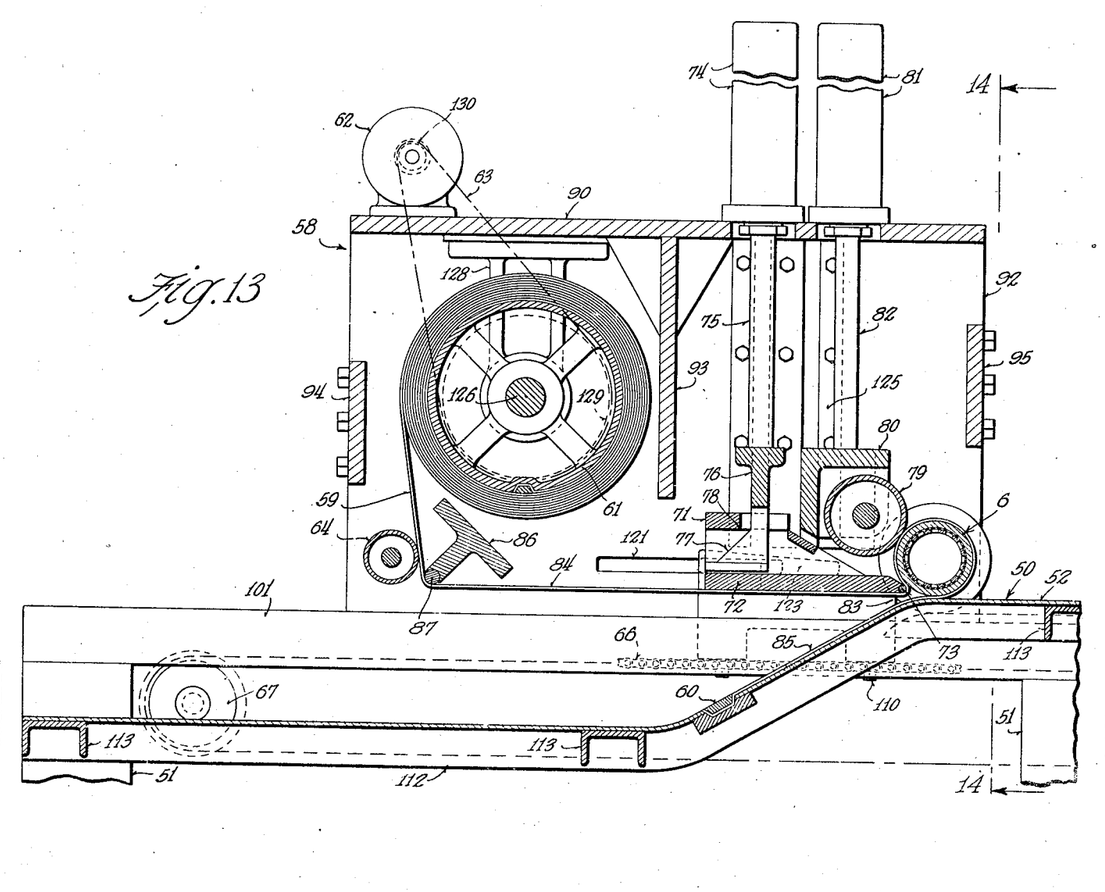
Fig. 13 is a detail view similar to Figs. 11 and 12, but showing the carriage in a position corresponding to that of Fig. 9.

It requires a great deal of tension on belt 59 to achieve the desired amount of pressure on the mantle, and the necessary belt tension could not be obtained unless means were employed to impede the forward movement of the carriage. And the constrictor member would not be effective to maintain the neck of the noose sufficiently constricted against the highly tensioned belt unless some means were provided for impeding the forward movement of the constrictor member. Otherwise expressed, the force required to move the carriage forward is not generally enough sufficiently to tension the belt and it consequently is necessary to apply a retarding force to the carriage so that additional belt tension will be developed in overcoming the retarding force. Likewise the weight of the constrictor member is not sufficient in itself to hold it in the position in which it is illustrated in Fig. 13 against the tension of the belt and it is therefore necessary to apply a retarding force to the constrictor member in order to hold it in the position illustrated. There are various expedients which could be resorted to for retarding the carriage and constrictor member, but the one which is regarded as most satisfactory, convenient and effective consists in utilizing hydraulic motor 69 as a brake. By reversing motor 69 a braking force can be applied to the constrictor member and to the mandrel and the carriage, which braking force is both controllable in degree and uniform in its action. In that way the tension on belt 59 can be kept constant and of definitely determinable amount so that every length of conduit put through the machine is given exactly the same treatment as all others; and once the optimum tension is determined it can easily be maintained because hydraulic motor 69 is inherently adapted to develop a constant torque in opposition to the pull of the belt.

The force which is applied by the belt to move the carriage forward during the rolling operation is transmitted in part from the mandrel to the adjacent blade-like portion 72 of constrictor member 71, and this causes the mandrel to tend to roll up on top of said blade-like portion and results in roller 73 being, in effect, forced into the neck of the noose, whereby to constrict said noose. This action is aided by the action of motor 69 in opposing the forward movement of the constrictor member. It is because of this constricting action that member 61 is called a constrictor member; and it is due at least in part, to the characteristic "digging in" action of the constrictor member that the noose embraces such a large part of the circumference of the mantle; but at the same time the mandrel and mantle are rolled within the noose.

As the coated mandrel rolls forward toward the front end of the machine under pressure exerted by the belt and under the kneading action exerted on the mantle by the ironing roll and the further kneading action exerted thereon by reason of its rolling movement, the free water is nearly all squeezed out of the mantle—said water passing partly through the pervious belt and partly through the tubular screen of the mandrel.

Figure 9:
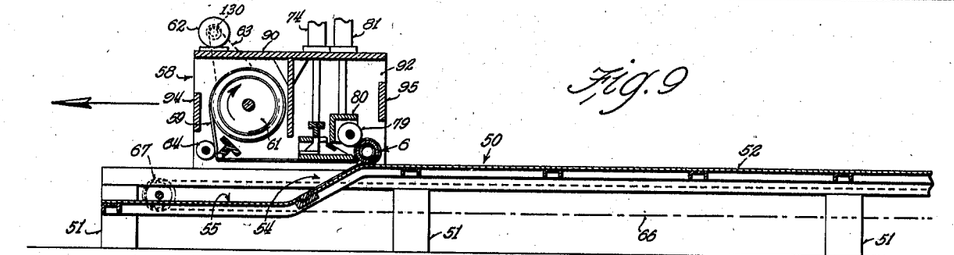
Fig. 9 is a fragmentary longitudinal sectional view of the front end of the machine, showing the carriage near the end of its forward travel.

Finally the carriage reaches nearly the end of its forward travel at the front end of the machine, having arrived at the position in which it is shown in Fig. 9, and the mandrel, together with the mantle thereon, is ready to be discharged from the machine. Comparing Fig. 9 with Fig. 10 it will be observed that in the latter the constrictor member and ironing roll have been lifted to their elevated position and that the belt has been pulled forward slightly and the mandrel is rolling down the incline at 54 to the horizontal depressed portion of the track at 55 from which it will be picked up by the operator and taken away.

Fig. 9 is reproduced on an enlarged scale and in clearer detail in Fig. 13, and from an inspection of these figures it will be seen that the mandrel is in a position which tends to obstruct the upward movement of the constrictor member. It will be apparent that in order to effect a direct upward movement thereof it would be expedient first to slacken off on the belt in order to allow the mandrel to roll back and clear the adjacent edge of the constrictor member. But that is not a convenient procedure, and to avoid the necessity of so doing, means are provided for moving the constrictor member slightly forward to a position wherein it will clear the mandrel before the upward movement of the constrictor member is started. Said means consists of the angular camming surfaces 77 on member 76 which, upon being elevated, engages edge 78 of the constrictor member and causes the latter to be pressed forwardly. But before applying fluid pressure to cylinder 74 to start the lifting operation on the constrictor member, motor 69 must be energized in a direction tending to drive the carriage forward. This is done, not primarily for the purpose of advancing the carriage, but for the purpose of releasing the constrictor member from certain coupling members hereinafter described and not previously mentioned, which overlie the ends of the constrictor member during the rolling operation and prevent its being lifted. This interference with upward movement of the constrictor member persists after the carriage has been brought to rest in the position shown in Fig. 9 until, as previously stated, motor 69 is energized to drive chains 65 and 66 whereby to move the previously mentioned coupling members to alternate positions wherein they do not interfere with the lifting of the constrictor member. This part of the operation is not sufficiently illustrated in Figs. 5 to 10 inclusive, but it will be adverted to in connection with the later-introduced discussion of the enlarged detail figures.

Figure 10:
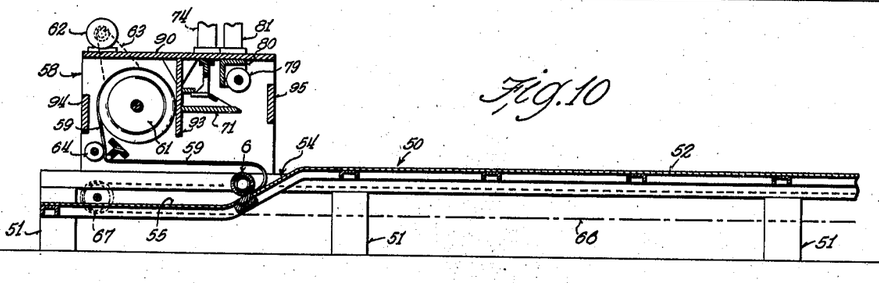
Fig. 10 is similar to Fig. 9, but shows the mandrel being discharged from the belt loop after the constrictor member and ironing roll have been elevated from the positions in which they are shown in Fig. 9.

After discharging the mandrel, as depicted in Fig. 10, the carriage is ready to be returned to the starting point at the back end of the track as illustrated in Fig. 5. The return movement is effected by means of hydraulic motor 69 and chains 65 and 66.

The several steps in the operation of the machine occur cyclically in a definite predetermined order which can be controlled by means of limit switches which are actuated automatically. Since the use of limit switches to control a series of actions is well understood, it is not considered necessary here to illustrate the automatic controls; nor for that matter the manual controls.

A motor driven hydraulic pump is shown at 131. This supplies the fluid-under-pressure for motors 62 and 69, but the fluid connections involved have been omitted from the drawings as unessential to a complete disclosure of the invention.

The guide bar 86 of T-shape cross section has not previously been mentioned. Its function as a guide for belt 59 is self-evident. To reduce wear on the belt, the contacting edge of guide bar 86 has an insert 87 consisting of a round steel or bronze roller which is capable of rotating in response to the movement of the belt. The ends of roller 87 and likewise roller 73, are journaled in any suitable manner, which it is not thought necessary to illustrate.

Figure 11:
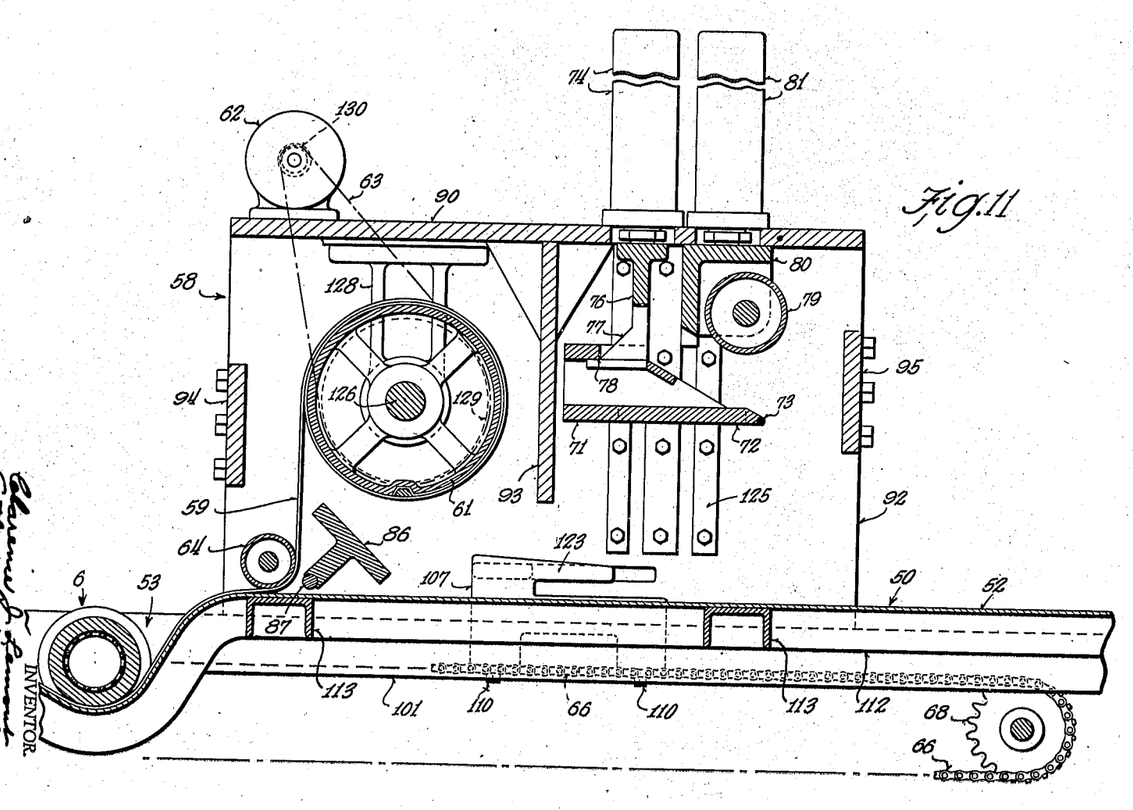
Fig. 11 is a detail view in longitudinal section of the carriage and portion of the track structure, with the former in the position in which it is shown on a smaller scale in Fig. 5.
Figure 12:
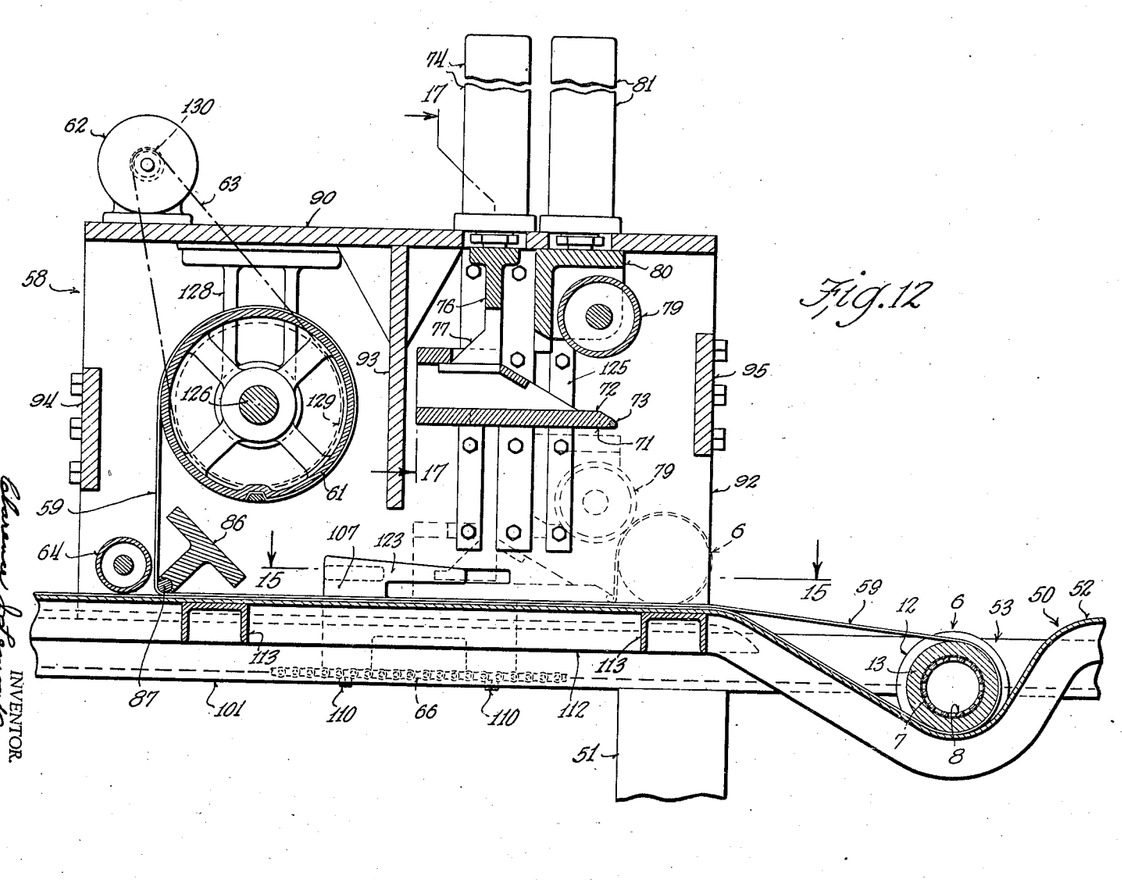
Fig. 12 is a detail view similar to Fig. 11, but showing the carriage in a position corresponding to that of Fig. 7.

Fig. 11 is an enlarged lengthwise sectional view of the carriage corresponding in all respects to the showing of Fig. 5, but exhibiting additional details not shown in Fig. 5. Fig. 12 similarly corresponds to Fig. 7, while Fig. 13 is an enlargement of Fig. 9.

The design of the carriage and arrangement of parts thereon as well as the design and orientation of those parts and the manner of mounting the carriage on the track structure and of connecting it with drive chains 65 and 66 will now be considered in more detail.

The carriage framework is a generally rectangular somewhat box-like structure made up of steel plates and bars welded together where feasible, but bolted where parts must be removable. The principal members thereof are: a top plate 90, side plates 91, 92, a center rib plate 93, and a pair of removable reinforcing bars or tie bars 94, 95. As shown in Fig. 14, which is taken at 14—14 of Fig. 3, the carriage extends all the way across the track structure and rests at 96, 97 on angle irons 98, 99 which extend the whole length of the track and are supported from the floor by supporting structure not illustrated. The carriage is slidable lengthwise on angle irons 98, 99.

Extending parallel to angle irons 98, 99 are a pair of additional angle irons 100, 101. Mounted on the top surfaces of angle irons 98 and 100 are a pair of guide bars 102, 103; and a similar pair of guide bars 104, 105 are correspondingly mounted on the top surfaces of angle irons 99 and 101. These extend substantially the entire length of the track structure and each pair forms conjointly a T-slot for the reception of a coupling member 106, 107 which members slide in the T-slots lengthwise of the track and serve as interconnecting media between the upper spans of drive chains 65, 66 and the carriage. In Fig. 14 it is shown how members 106 and 107 are drivingly connected by means of cap screws 109, 110 to the upper spans of said chains.

The steel structure which supports plate 52 includes channel irons 111, 112 and several laterally extending channel irons 113. Rails 56 and 57 are supported on bars 114, 115 which extend the whole length of the track structure.

As shown in Fig. 14 there are two hydraulic cylinders 81 and two piston rods 82 therefor, which are connected to cross-head casting 80; and the latter is guided at its two ends and supported by means of angle plates 116, 117 against the thrust applied to the ironing roll by the mandrel.

Figure 15:
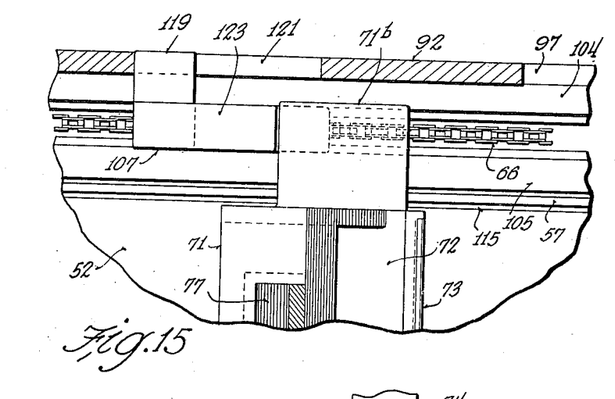
Fig. 15 is a fragmentary sectional view taken along the line 15—15 of Fig. 12 and illustrating a condition which obtains when the carriage is being propelled forwardly by the driving chain.
Figure 16:
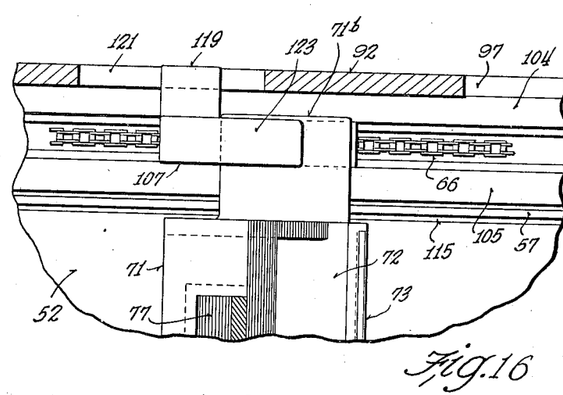
Fig. 16 is similar to Fig. 15 and illustrates an alternative condition which obtains when the carriage is being propelled forwardly by the belt and restrained by the drive chain.

Members 106 and 107 have laterally extending arms 118, 119 which project into elongated slots 120, 121, in side plates 91, 92, respectively, of the carriage—which slots extend in a direction parallel to the travel of the carriage. Members 106, 107 also have backwardly extending arms 122, 123 (see Figs. 12, 15 and 16) which are designed to overlie respectively associated end portions 71a and 71b (Figs. 15, 16 and 17) of constrictor member 71 when the carriage is being moved forwardly by belt 59 (see Fig. 16), but not when the carriage is being driven forwardly by chains 65, 66 and motor 69 (see Fig. 15). Arms 122 and 123 serve to hold the constrictor member down when it is in its operative position as shown, for example, in Fig. 13. Fig. 15 illustrates most effectively what occurs when the carriage is being driven forward by chains 65 and 66 and in that figure it will be observed that end portion 71b is not covered by arm 123 and therefore is not obstructed against upward movement. It will be seen, then, that constrictor member 71 can be lifted from its down position when members 106 and 107 are moved forward to positions wherein arms 118 and 119 engage the front ends of slots 120 and 121 respectively. But when the carriage is being moved forwardly by belt 59, members 106 and 107 assume the positions illustrated in Fig. 16 and the constrictor member cannot be lifted because it is obstructed by arms 122 and 123 as shown in that figure.

Figure 17:
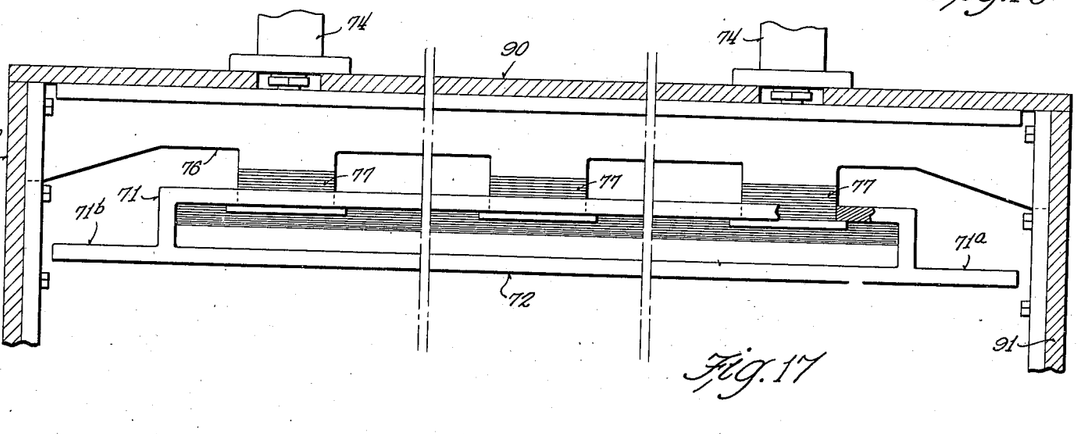
Fig. 17 is a sectional detail view taken along the line 17—17 of Fig. 12.

Upon inspection of Fig. 17, it will be seen that member 76 is guided at its ends by guide bars 124, 125 which are bolted to side plates 91 and 92 of the carriage; and it will further be seen that member 76 has three downwardly projecting cam portions 77 which serve both to lift constrictor member 71 and to effect limited forward movements thereof in the manner previously described.

Winding reel or drum 61 is supported on a shaft 126 which is journaled in hangers 127, 128. To shaft 126 is affixed a driven sprocket 129, which is connected with driving sprocket 130 on motor 62 by means of chain 63.

Upon removing the mandrels from the machine following completion of the pressing and rolling operations thereon, the tubular mantles are stripped from the screen and placed in an oven where they are dried sufficiently to enable them to be handled freely. Thereafter the conduit is allowed to stand until thoroughly hardened whereupon the ends may be machined to accommodate coupling sleeves.

In some instances it has been found that the mantles are more easily removable from the mandrels if, before stripping, they are rolled gently along a flat surface such as a table top. This tends to reduce the adherence of the mantle to the mandrel; but such rolling should be performed cautiously and abstemiously to avoid cracking the mantle or disturbing its internal structure to an extent which might result in the development of cracks during the subsequent drying. Also, it appears sometimes to be advantageous, after loosening the mantle by rolling, to subject it to a short preliminary drying before stripping. But the preliminary drying preferably should not continue long enough to permit the mantle to acquire a permanent set.

We claim:

1. The combination in a machine for squeezing conduit in the plastic state, comprising: a mandrel forming a supporting core for a tubular plastic mantle of conduit material, a belt having a looped portion forming a noose embracing said mandrel and the mantle thereon circumferentially, a shoe extending transversely of said belt and bearing against said belt at the outside of said looped portion adjacent the neck of said noose, said shoe functioning to keep said noose in contact with said mantle throughout nearly the whole circumference thereof, and power means for tensioning said belt lengthwise to contract said noose and thereby squeeze said mantle.

2. The combination in a machine for squeezing conduit in the plastic state, comprising: a mandrel forming a supporting core for a tubular plastic mantle of conduit material, structure defining a slot extending lengthwise of and adjacent said mandrel, a belt extending through said slot and around said mandrel and then back through said slot to form a noose embracing said mandrel and the mantle thereon, and means for applying tension to at least one end of said noose whereby to squeeze said mantle.

3. The combination in a machine for operating on conduit in the plastic state, comprising: a track, a mandrel forming a supporting core for a tubular plastic mantle of conduit material, said mandrel being rollable on and along said track, a belt extending lengthwise of said track and doubled upon itself to form a noose embracing said mandrel and the mantle thereon, means acting upon said belt for constricting the neck of said noose, and power means for pulling said belt lengthwise to tighten said noose and roll said mandrel along said track while concurrently effecting a rolling movement of said mantle with respect to the interior surface of said noose.

4. The combination in a machine for operating on conduit in the plastic state, comprising: a track, a mandrel forming a supporting core for a tubular plastic mantle of conduit material, said mandrel being rollable on and along said track, a belt extending lengthwise of said track and doubled upon itself to form a noose embracing said mandrel and the mantle thereon, a carriage movable along said track, a shoe supported by said carriage and movable therewith along said track, said shoe extending transversely of said belt and bearing against said belt at the outside of said noose and adjacent the neck thereof, said shoe functioning to keep said noose in contact with said mantle throughout nearly the whole circumference thereof, power means connected with said belt for applying tension thereto lengthwise in a direction effective to move said carriage and said mandrel forward along said track, the tension of said belt being transmitted to said carriage through said mandrel, and yieldable means for restraining the forward movement of said shoe and said carriage, said yieldable means being effective, in co-operation with said power means and said shoe, to cause said noose to grip tightly said mantle while said mandrel and mantle are rolling forward.

5. The combination in a machine for operating on conduit in the plastic state, comprising: a track, a mandrel forming a supporting core for a tubular plastic mantle, said mandrel being rollable on and along said track, a belt extending lengthwise of said track and doubled upon itself to form a noose embracing said mandrel and the mantle thereon, a carriage movable along said track, a shoe supported by said carriage and movable therewith along said track, said shoe extending transversely of said belt and bearing against said belt at the outside of said noose and adjacent the neck thereof, said shoe functioning to keep said noose in contact with said mantle throughout nearly the whole circumference thereof, a reel movable with said carriage, one end of said belt being connected to said reel, power means for rotating said reel to wind said belt thereon for tensioning said belt lengthwise, thereby causing said carriage and said mandrel to move forward in unison while effecting a rolling movement of said mantle with respect to the interior surface of said noose, and yieldable means for restraining the forward movement of said carriage, said yieldable means being effective, in cooperation with said reel, said power means and said shoe, to cause said noose to grip tightly said mantle while said mandrel and mantle are rolling forward.

6. The combination in a machine for operating on conduit in the plastic state, comprising: a mandrel forming a supporting core for a tubular plastic mantle, an elongated belt folded to form a noose embracing said mandrel and the mantle thereon, said belt being approximately coextensive widthwise with the length of said mantle, a constrictor member having a surface adjacent and parallel lengthwise to said mandrel and bearing against the surface of said belt oppositely to said mantle and approximately coextensively with the length thereof, said constrictor member being contributively operative to guide said belt for forming therein the neck of said noose and thus effective to force said belt to contact the periphery of said mantle throughout nearly a complete circle, means for moving said belt lengthwise to effect rotation of said mandrel and mantle and also to effect a rolling movement of said mantle along the inner surface of said noose, said constrictor member being contributively effective to tighten said noose about said mandrel and mantle.

7. The combination in a machine for operating on conduit in the plastic state, comprising: a mandrel forming a supporting core for a tubular plastic mantle, an elongated belt extending lengthwise normally to the axis of said mandrel, means operative to fold said belt into a noose embracing said mandrel and the mantle thereon, said belt being approximately coextensive widthwise with the length of said mantle, said means including a carriage movable lengthwise of said belt, a constrictor member having a blade-like portion the edge of which is parallel, lengthwise, to said mandrel, said constrictor member being movable with said carriage lengthwise of said belt and having at least a limited extent of free forward and back movement relatively to said carriage and lengthwise of said belt, means operative to effect said relative free forward movement, means operative to lift said constrictor member, said constrictor member being operative to engage its said blade-like portion with the surface of said belt oppositely to said mantle and coextensively with the length of said mantle, said constrictor member being contributively operative to guide said belt for forming therein the neck of said noose and thus effective to force said belt to grip tightly the periphery of said mantle throughout the greater part of a complete circle, and means for pulling the leading portion of said belt lengthwise to effect rotation of said mandrel and mantle and also to effect a rolling movement of said mantle along the inner surface of said noose.

8. The combination in a machine for operating on conduit in the plastic state, comprising: a mandrel forming a supporting core for a tubular plastic mantle, an elongated belt extending lengthwise normally to the axis of said mandrel, means operative to fold said belt into a noose embracing said mandrel and the mantle thereon, said belt being approximately coextensive widthwise with the length of said mantle, said means including a carriage movable lengthwise of said belt, a constrictor member supported by and movable with said carriage, said constrictor member having a blade-like portion the edge of which is parallel, lengthwise, to said mandrel, means operative to lift and lower said constrictor member, said blade-like portion being movable, when in lowered position, into engagement with the surface of said belt oppositely to said mantle, coextensively with the length of said mantle and closely adjacent to the periphery of said mantle whereby contributively to constrict the neck of said noose at a point closely adjacent the periphery of said mantle to force said belt to grip tightly the periphery of said mantle throughout the greater part of a complete circle, and means for pulling the leading portion of said belt lengthwise to effect rotation of said mandrel and also to effect a rolling movement of said mantle along the inner surface of said noose.

9. The combination in a machine for operating on conduit in the plastic state, comprising: a track, a mandrel forming a supporting core for a tubular plastic mantle, said mandrel being removably supportable crosswise on and rollable along said track, a carriage movable forward and back along said track and operative to pass over said mandrel during its forward travel, an elongated belt arranged to be extensible lengthwise on and along said track and having one end anchored near the forward end of said track, a winding reel disposed above and movable along said track, the other end of said belt being connected with said reel, means for rotating said reel to wind said belt thereon, a constrictor member disposed to the rear of said reel and movable along said track with said carriage, and means supported by said carriage for lifting and lowering said constrictor member, said constrictor member having a blade-like portion extending crosswise of said track and operative to engage said belt in a manner effective, contributively, to loop said belt around said mandrel and the mantle thereon whereby to grippingly embrace said mantle throughout the greater part of its circumference during a portion of the forward travel of said carriage.

10. The combination in a machine for operating on conduit in the plastic state, comprising: a track, a mandrel forming a supporting core for a tubular plastic mantle, said mandrel being removably supportable crosswise on and rollable along said track, a carriage movable forward and back along said track and operative to pass over said mandrel during its forward travel, an elongated belt arranged to be extensible lengthwise on and along said track and having one end anchored near the forward end of said track, a winding reel supported by said carriage and disposed above said track, the other end of said belt being connected with said reel, power means for rotating said reel to wind said belt thereon, a constrictor member situated rearwardly of said reel and movable along said track with said carriage, said constrictor member being also movable forward and back to a limited extent relatively to said carriage, said constrictor member having a blade-like portion operative conjointly with said mandrel and said track to grippingly loop said belt around said mandrel, means supported by said carriage for lifting and lowering said constrictor member, and means operative to move said constrictor member forward relatively to said carriage and said mandrel to a position wherein it will clear said mandrel and the belt therearound preliminarily to upward movement of said constrictor member.

11. The combination in a machine for operating on conduit in the plastic state, comprising: a track, a carriage disposed above and movable along said track, a winding reel supported by said carriage and movable therewith along and above said track, a mandrel forming a supporting core for a tubular plastic mantle, said mandrel being disposed rearwardly of said reel during forward movement of said carriage and rollable along said track, a belt having one end anchored near the forward end of said track and its other end connected to said reel, said belt passing around and embracing said mandrel and the mantle thereon, means for depressing said belt adjacent and forwardly of said mandrel, power means for rotating said reel for winding said belt thereon and thereby effecting forward movement of said carriage and mandrel, and means yieldably opposing the forward movement of said carriage for increasing the tension of said belt where it embraces said mandrel.

12. The combination in a machine for operating on conduit in the plastic state, comprising: an elongate track, a dip in said track near the front end thereof, a second dip in said track toward the back end thereof, a mandrel forming a supporting core for a tubular plastic mantle, said mandrel extending crosswise of said track and rollable therealong, a carriage disposed above and movable along said track, said carriage being movable backwardly to a position at the rear of said second dip and forwardly to a position overlying said first dip, the depths of said dips being sufficient to provide clearance for said carriage to pass thereover despite the conditions hereinafter specified, a winding reel supported by said carriage and movable therewith along said track, an elongated belt having one end anchored near the front end of said track and the other end attached to said winding reel, power means for rotating said reel for winding said belt thereon, a constrictor member supported by said carriage and disposed rearwardly of said reel, said belt lying on and extending along said track lengthwise thereof, and said mandrel resting on said belt in said second dip when said carriage is in its rear position, the arrangement being such that when said carriage moves forwardly from its rear position and passes over said second dip and the mandrel therein, said belt will enfold said mandrel and the mantle thereon, said constrictor member having a blade-like portion extending transversely of said belt and co-extensive lengthwise with the width of said belt, means for lifting and lowering said constrictor member relatively to said belt, said constrictor member being operative to depress said belt forwardly of said mandrel after passing over said second dip during the forward movement of the carriage whereby to form a noose in said belt embracing said mandrel and the mantle thereon, said constrictor member being contributively operative, conjointly with said reel and power means, to tighten said noose whereby to squeeze said mantle, an ironing roll extending crosswise of said track and operative to engage peripherally the exterior of said noose coextensively with the length of said mantle, said ironing roll being supported by said carriage and movable therewith along said track, and means for lifting and lowering said ironing roll, said mandrel with the mantle thereon being dischargeable from said noose into said first dip in response to upward movement of said constrictor member when said carriage has reached the end of its forward travel.

13. The combination in mechanism for operating on conduit in the plastic state, comprising: an elongate belt, a mandrel forming a supporting core for a tubular plastic mantle, said mandrel, together with the mantle thereon, lying on said belt and extending crosswise thereof, said belt being looped around said mandrel in close-embracing peripheral contact with the mantle thereon, means connected with the leading end of said belt for pulling said belt lengthwise forwardly and effective to cause said mandrel and the mantle thereon to roll forwardly, and means engaging said belt forwardly of said mandrel and adjacent thereto for constricting the neck of the loop in the belt embracing said mandrel, said means being movable forwardly with said mandrel while continuing to perform its previously-designated function.

14. The combination in mechanism for operating on conduit in the plastic state, comprising: an elongate belt, a mandrel forming a supporting core for a tubular plastic mantle, said mandrel, together with the mantle thereon, lying on said belt and extending crosswise thereof, said belt being looped around said mandrel in close-embracing peripheral contact with the mantle thereon, means connected with the leading end of said belt for pulling said belt lengthwise forwardly to cause said mandrel and the mantle thereon to roll forwardly, means engaging said belt forwardly of said mandrel and adjacent thereto for constricting the neck of the loop in the belt embracing said mandrel, said means being movable forwardly with said mandrel while continuing to perform its previously designated function, and an ironing roll substantially parallel axially with said mandrel and tangentially engaging the exterior peripheral surface of the loop therein which embraces said mandrel, said ironing roll being operative to press against said loop and thereby impart localized pressure to said mantle peripherally and radially thereof along a line parallel to the axis of said mandrel.

15. The combination in mechanism for operating on conduit in the plastic state, comprising: an elongate belt, a mandrel forming a supporting core for a tubular plastic mantle, said mandrel together with the mantle thereon, lying on said belt and extending crosswise thereof, said belt being looped around said mandrel in close-embracing peripheral contact with the mantle thereon, means connected with said belt for pulling said belt lengthwise to cause said mandrel and the mantle thereon to rotate, and means engaging said belt closely adjacent said mandrel for constricting the neck of the loop embracing said mandrel.

16. The combination in mechanism for operating on conduit in the plastic state, comprising: an elongate belt, a mandrel forming a supporting core for a tubular plastic mantle, said mandrel together with the mantle thereon, lying on said belt and extending crosswise thereof, said belt being looped around said mandrel in close-embracing peripheral contact with the mantle thereon, means connected with said belt for pulling said belt lengthwise to cause said mandrel and the mantle thereon to rotate, means engaging said belt closely adjacent said mandrel for constricting the neck of the loop embracing said mandrel, and an ironing roll substantially parallel axially with said mandrel and tangentially engaging the exterior peripheral surface of the loop in said belt which embraces said mandrel, said ironing roll being operative to press against said loop and thereby impart localized pressure to said mantle peripherally and radially thereof along a line parallel to the axis of said mandrel.

17. The combination in mechanism for operating on conduit in the plastic state, comprising: an elongate belt, a mandrel forming a supporting core for a tubular plastic mantle, said mandrel with the mantle thereon lying on said belt and extending crosswise thereof, said belt being looped around said mandrel in close-embracing peripheral contact with the mantle thereon, means connected with said belt for pulling said belt lengthwise forwardly and effective to cause said mandrel and the mantle thereon to roll forwardly, means engaging said belt forwardly of said mandrel and adjacent thereto for constricting the neck of the loop in the belt embracing said mandrel, said means being movable forwardly with said mandrel while continuing to perform its previously-designated function, and an ironing roll disposed forwardly of said mandrel and substantially parallel axially with said mandrel and tangentially engaging the exterior peripheral surface of the loop in said belt which embraces said mandrel, said ironing roll being operative to press against said loop and thereby impart localized pressure to said mantle peripherally and radially thereof along a line parallel to the axis of said mandrel, said mandrel and mantle being rotational relatively to said line, said ironing roll being movable forwardly with said mandrel.

18. The combination in a machine for operating on conduit in the plastic state, comprising: an elongate track, a mandrel forming a supporting core for a tubular plastic mantle, said mandrel extending crosswise of said track and rollable lengthwise therealong, an elongate belt anchored near the front end of said track and adapted to extend lengthwise on and along said track, a carriage disposed above and movable along said track, a winding reel supported by said carriage and movable therewith along said track, said belt being connected with said reel, power means for rotating said reel to wind said belt thereon, said belt being looped circumferentially around said mandrel and the mantle thereon and in close contact with said mantle throughout nearly all of its peripheral area, and a second power means for propelling said carriage forwardly and back along said track, said second power means being alternatively operative yieldably to impede the forward movements of said carriage along said track.

19. The combination in a machine for operating on conduit in the plastic state, comprising: an elongate track, a mandrel forming a supporting core for a tubular plastic mantle, said mandrel extending crosswise of said track and rollable lengthwise therealong, an elongate belt anchored near the front end of said track and adapted to extend lengthwise on and along said track, a carriage disposed above and movable along said track, a winding reel supported by said carriage and movable therewith along said track, said belt being connected with said reel, power means for rotating said reel to wind said belt thereon, said belt being looped circumferentially around said mandrel and the mantle thereon and in close contact with said mantle throughout nearly all of its peripheral area, a driving chain extending along said track and drivingly connected with said carriage, and a hydraulic motor drivingly connected with said chain, said motor being operative to propel said carriage along said track through the medium of said chain and operative, alternatively, as a brake for impeding the movement of said carriage along said track.

20. The combination in mechanism for operating on conduit in the plastic state, comprising: a track, a carriage disposed above and movable along said track, a mandrel forming a supporting core for a tubular plastic mantle, said mandrel being rollable on and along said track and situated adjacent said carriage, a belt extending lengthwise on and along said track and looped circumferentially around said mandrel and the mantle thereon, a constrictor member situated forwardly of and adjacent said mandrel and having a blade-like portion extending lengthwise of said mandrel and operating to pressingly engage said belt adjacent said mandrel to cause the looped portion of said belt to squeeze said mantle, said constrictor member being movable to a limited extent forwardly and backwardly relatively to said mandrel and said carriage, means supported by said carriage for lifting said constrictor member, and cam means interposed between said constrictor member and said lifting means and operative to move said constrictor member forward relatively to said mandrel as a prelude to the lifting of said constrictor member, said cam means being actuable by said lifting means.

21. The combination in mechanism for operating on conduit in the plastic state, comprising: a track, a carriage disposed above and movable along said track, a mandrel forming a supporting core for a tubular plastic mantle, said mandrel being rollable on and along said track and situated adjacent said carriage, a belt extending lengthwise on and along said track and looped circumferentially around said mandrel and the mantle thereon, a winding reel supported by said carriage, said belt being connected with said winding reel, means for rotating said reel for winding said belt thereon, a constrictor member situated rearwardly of said reel and forwardly of and adjacent said mandrel, said belt extending from said reel and under said constrictor member and then around said mandrel and back under said constrictor member, and thence to an anchorage near the front end of said track, said constrictor member having a blade-like portion extending lengthwise of said mandrel and operative to pressingly engage said belt adjacent said mandrel to cause the looped portion of said belt to squeeze said mantle, said constrictor member being movable to a limited extent forwardly and backwardly relatively to said mandrel and said carriage, means supported by said carriage for lifting said constrictor member, and means interposed between said constrictor member and said lifting means and operative to move said constrictor member forward relatively to said mandrel and said carriage as a prelude to the lifting of said constrictor member, said last-mentioned means being actuable by said lifting means.

22. The combination in a machine for operating on conduit in the plastic state, comprising: a track, a carriage overlying and movable forward and back along said track, a constrictor member extending crosswise of said track and movable along said track with said carriage, means supported by said carriage for lifting and lowering said constrictor member, a drive chain extending lengthwise of said track, power means for driving said chain, a coupling member connected to said chain and movable lengthwise of said track, said coupling member being drivingly associated with said carriage for propelling said carriage along said track, said coupling member having limited free movement forward and back relatively to said carriage, said coupling member having a portion arranged to overlie said constrictor member when said constrictor member is in its down position and said coupling member is in its back position relative to said carriage, said overlying portion of said coupling member being out of overlying relation to said constrictor member when said coupling member is in its forward position relative to said carriage.

23. The combination in a machine for operating on conduit in the plastic state, comprising: a track, a carriage overlying and movable forward and back along said track, a constrictor member extending crosswise of said track and movable along said track with said carriage, a drive chain extending along said track, a coupling member interconnecting said chain and said carriage for propelling said carriage along said track, said coupling member having limited freedom of movement forward and back relatively to said carriage, said coupling member being disposed in the path of said constrictor member along said track whereby it is operative to obstruct forward movement of said constrictor member, and power means connected with said chain, said power means being operative to propel said carriage through the medium of said chain and coupling member, said power means being operative, alternately, through the medium of said chain and coupling member to yieldably restrain forward movement of said carriage and said constrictor member along said track.

24. The combination in a machine for operating on conduit in the plastic state, comprising: a track, a carriage overlying and movable forward and back along said track, a winding reel supported by said carriage and movable therewith along said track, a belt anchored at one end near the front end of said track and connected at its other end to said winding reel, power means for rotating said reel for winding said belt thereon, a mandrel forming a supporting core for a tubular plastic mantle, said mandrel extending crosswise of said track and rollable therealong, said belt being looped around said mandrel, a constrictor member overlying and extending crosswise of said track and movable therealong, said constrictor member being disposed in advance of said mandrel and having a blade-like portion the edge of which is disposed adjacent and parallel lengthwise to the periphery of said mandrel and in pressing engagement with the surface of said belt, means supported by said carriage for lifting and lowering said constrictor member, a pair of drive chains extending lengthwise of said track and disposed at either side thereof, hydraulic power means for driving said chains, a pair of coupling members disposed at either side of said track and connected individually to said chains, said carriage having a pair of elongated slots disposed at either side of said track and respectively engageable by said coupling members for effecting driving interengagement between said coupling members and said carriage for propelling said carriage along said track, said slots being effective to afford a limited forward and back freedom of movement between said carriage and said coupling members, said coupling members being disposed in the forward path of said constrictor member and operative during forward movement of said carriage, under the propulsive action of said belt and in co-operation with said chain and said hydraulic power means to oppose the forward movement of said constrictor member, said coupling members being thereby further operative to cause the loop in said belt encircling said mandrel to grip said mandrel circumferentially.

25. The combination in a machine for operating on conduit in the plastic state, comprising: a mandrel forming a supporting core for a tubular plastic mantle, an elongate track having a depressed portion at its forward end and a dip near its back end, said mandrel being rollable along said track and disposable in said dip with its longitudinal axis extending crosswise of said track, said dip constituting the starting point of said mandrel in its travel along said track toward the front end thereof, a carriage overlying said track and movable forward and back therealong, the starting point of the forward travel of said carriage being at the rear of said dip, a winding reel supported by said carriage and movable therewith along said track, a constrictor member movable along said track with said carriage and situated to the rear of said reel, means supported by said carriage for lifting and lowering said constrictor member, an ironing roll situated rearwardly of said constrictor member and movable along said track with said carriage, means supported by said carriage for lifting and lowering said ironing roll, said constrictor member and said ironing roll overlying and extending crosswise of said track, a belt having one end anchored near the front end of said track and its other end connected to said winding reel, power means for rotating said reel for winding said belt thereon, said belt being extensible lengthwise from its anchorage near the front end of said track on and along said track backwardly through said dip and under said mandrel therein, a drive chain extending lengthwise of said track, a motor for driving said chain for propelling said carriage along said track, said motor being operative, alternately, as a load on said chain restraining forward movement of said carriage, coupling means interconnecting said chain and said carriage, said coupling means having limited forward and back free movement relatively to said carriage and operative in its forward position as a propelling medium for said carriage, and in its back position as a restraining medium opposing the forward movement of said carriage and said constrictor member, said motor, drive chain and coupling means being co-operative to propel said carriage forwardly from its starting point to a point forward of said dip and effective in so doing to loop said belt around said mandrel and the mantle thereon and thereby to draw said mandrel and mantle out of said dip toward the front end of said track, said ironing roll, in its lowered position, being operative to obstruct the forward movement of said mandrel and thus effective as a coupling medium between said mandrel and said carriage for propelling said carriage forwardly in response to tension applied to said belt by said reel, said constrictor member being operative in its lowered position, after said carriage has moved forwardly over said dip, to depress said belt and thereby cause the loop in said belt embracing said mandrel to tightly grip said mandrel and the mantle thereon, said belt and reel being co-operative to propel said carriage forwardly when said mandrel has been advanced into engagement with said ironing roll.

CLARENCE J. LEMONT.
ANTHONY J. HOYNACKE.